(12) United States Patent
Kamikihara

(10) Patent No.: US 10,410,786 B2
(45) Date of Patent: Sep. 10, 2019

(54) POWER RECEPTION DEVICE AND POWER TRANSMISSION DEVICE

(71) Applicant: Toyota Jidosha Kabushiki Kaisha, Toyota-shi, Aichi-ken (JP)

(72) Inventor: Daisuke Kamikihara, Toyota (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 149 days.

(21) Appl. No.: 15/826,173

(22) Filed: Nov. 29, 2017

(65) Prior Publication Data

US 2018/0158599 A1    Jun. 7, 2018

(30) Foreign Application Priority Data

Dec. 7, 2016   (JP) .................. 2016-237559

(51) Int. Cl.
| | |
|---|---|
| *H01F 27/36* | (2006.01) |
| *H02J 50/12* | (2016.01) |
| *H01F 38/14* | (2006.01) |
| *H01F 27/02* | (2006.01) |
| *H02J 50/70* | (2016.01) |
| *H02M 1/44* | (2007.01) |
| *H01F 27/40* | (2006.01) |
| *B60L 53/12* | (2019.01) |
| *H02J 7/02* | (2016.01) |
| *H02M 3/335* | (2006.01) |

(52) U.S. Cl.
CPC ............ *H01F 27/362* (2013.01); *B60L 53/12* (2019.02); *H01F 27/02* (2013.01); *H01F 27/365* (2013.01); *H01F 27/40* (2013.01);

*H01F 38/14* (2013.01); *H02J 50/12* (2016.02); *H02J 50/70* (2016.02); *H02M 1/44* (2013.01); *H02J 7/025* (2013.01); *H02M 3/33569* (2013.01)

(58) Field of Classification Search
CPC ...... H01F 27/362; H01F 27/02; H01F 27/365; H01F 27/40; H01F 38/14; H02J 50/12; H02J 50/70; H02J 7/025; B60L 53/12; H02M 1/44; H02M 3/33569
See application file for complete search history.

(56) References Cited

U.S. PATENT DOCUMENTS

| | | |
|---|---|---|
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2017/0237295 A1 | 8/2017 | Yuasa |

FOREIGN PATENT DOCUMENTS

| | | |
|---|---|---|
| EP | 3065152 A1 | 9/2016 |
| JP | 2013-110822 A | 6/2013 |
| JP | 2013-126327 A | 6/2013 |
| JP | 2013-146148 A | 7/2013 |

(Continued)

*Primary Examiner* — Robert L Deberadinis
(74) *Attorney, Agent, or Firm* — Dinsmore & Shohl LLP

(57) ABSTRACT

A power reception device includes a coil; an electric unit electrically connected to the coil; and a metal case that is disposed to be adjacent to the coil and accommodates the electric unit. The electric unit includes at least one active element. The metal case includes an a inner-side wall adjacent to the coil, and an outer-side wall that is positioned on the opposite side of the coil from the inner-side wall. The at least one active element is provided at a position closer to the outer-side wall than to the inner-side wall.

8 Claims, 12 Drawing Sheets

(56) References Cited

FOREIGN PATENT DOCUMENTS

| | | |
|---|---|---|
| JP | 2013-146154 A | 7/2013 |
| JP | 2013154815 A | 8/2013 |
| JP | 2016046865 A | 4/2016 |
| JP | 2016129164 A | 7/2016 |
| WO | 2016027570 A1 | 2/2016 |

POWER RECEPTION DEVICE AND POWER TRANSMISSION DEVICE

CROSS-REFERENCE TO RELATED APPLICATIONS

This application claims priority to Japanese Patent Application No. 2016-237559 filed on Dec. 7, 2016, which is incorporated herein by reference in its entirety including the specification, drawings and abstract.

BACKGROUND

1. Technical Field

The disclosure relates to a power reception device and a power transmission device.

2. Description of Related Art

In the related art, various non-contact charging systems in which electric power is transmitted from a power transmission device to a power reception device in a non-contact manner have been proposed (Japanese Unexamined Patent Application Publication No. 2013-154815 (JP 2013-154815 A), Japanese Unexamined Patent Application Publication No. 2013-146154 (JP 2013-146154 A), Japanese Unexamined Patent Application Publication No. 2013-146148 (JP 2013-146148 A), Japanese Unexamined Patent Application Publication No. 2013-110822 (JP 2013-110822 A), Japanese Unexamined Patent Application Publication No. 2013-126327 (JP 2013-126327 A).

For example, a power reception device described in Japanese Unexamined Patent Application Publication No. 2016-129164 (JP 2016-129164 A) includes a spiral power reception coil, a ferrite plate of which the power reception coil is disposed on the upper surface, an electrical element connected to the power reception coil, and an accommodation case. The accommodation case includes a metal mounting plate, a metal side wall, and a resin lid member. The power reception coil, the ferrite plate, and the electrical element are accommodated in the accommodation case. The electrical dement is disposed on a side of the power reception coil and the ferrite plate in a width direction.

A power transmission device includes a spiral power transmission coil, a ferrite plate on which the power transmission coil is disposed, an electrical element, and an accommodation case. In the accommodation case, the electrical element is disposed on a side of the power transmission coil and the ferrite plate in a width direction.

SUMMARY

During electric power transmission, currents flow in the electrical element of the power reception device and the electrical element of power transmission device. When a current flows in each electrical element, noise is emitted from each electrical element.

In the power reception device and the power transmission device described in JP 2016-129164 A, since the lid member of the accommodation case is made of resin, noise emitted from the electrical element may be emitted to the outside through the lid member.

Therefore, it has been known that, in a power reception device, a power reception coil and a ferrite plate are accommodated in a coil accommodation case, and an electrical element is accommodated in a metal case adjacent to the coil accommodation case so that the leakage of noise from the electrical element to the outside is suppressed.

However, in the power reception device in which the electrical element is accommodated in the metal case as described above, during the power reception, an electromagnetic field formed in the vicinity of the power reception coil also enters the metal case, and thus affects an active element of the electrical element. A similar problem arises in the power transmission device.

The disclosure provides a power reception device which can suppress the influence of the electromagnetic field formed in the vicinity of the power reception coil on the active element of the electrical element provided in the power reception device, during the power reception. In addition, the disclosure provides a power transmission device which can suppress the influence of the electromagnetic field formed in the vicinity of the power transmission coil of the active element of the electrical element provided in the power transmission device, during the power transmission.

A power reception device according to the disclosure includes a coil; an electric unit; and a metal case. The electric unit is electrically connected, to the coil. The metal case is disposed to be adjacent to the coil, and accommodates the electric unit. The electric unit includes at least one active element. The metal case includes an inner-side wall adjacent to the coil, and an outer-side wall that is positioned on the opposite side of the coil from the inner-side wall. The at least one active element is provided at a position closer to the outer-side wall than to the inner-side wall.

In the power reception device, during the power reception, an electromagnetic field is formed in the vicinity of the power reception coil. Even when the electromagnetic field enters the metal case, since the at least one active element is provided to be closer to the outer-side wall than to the inner-side wall, it is possible to suppress the exposure of the corresponding active element to the electromagnetic field having high strength.

A power reception device according to the disclosure includes a coil; a ferrite plate; an electric unit; and a metal case. The coil is formed by winding a coil wire, and is formed in a hollow shape. The coil is disposed on the ferrite plate. The electric unit is electrically connected to the coil. The metal case is disposed to be adjacent to the coil, and accommodates the electric unit. The electric unit includes at least one active element. The ferrite plate includes a coil mounting surface on which the coil is disposed. A notch is formed in an outer peripheral edge portion of the ferrite plate. The width of the notch is formed to be increased from an inner peripheral edge portion side of the coil to an outer peripheral edge portion side of the coil. The at least one active element is disposed in an adjacent area that is adjacent to the notch, in the metal case.

With the power reception device, during the power reception, the flux passing through the notch is small. Therefore, it is possible to suppress the exposure of the active element disposed in the adjacent area that is adjacent to the notch to the electromagnetic field having high strength.

With fee power reception device according to the disclosure, it is possible to suppress the influence of the electromagnetic field formed in the vicinity of the power reception coil on the active element of the electrical element provided in the power reception device, during the power reception. With the power transmission device according to the disclosure, it is possible to suppress the influence of the electromagnetic field formed in the vicinity of the power transmission coil on the active element of the electrical element provided in the power transmission device, during the power transmission.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a plan view illustrating the power reception device and the like;

DETAILED DESCRIPTION OF EMBODIMENTS

Figure 1:
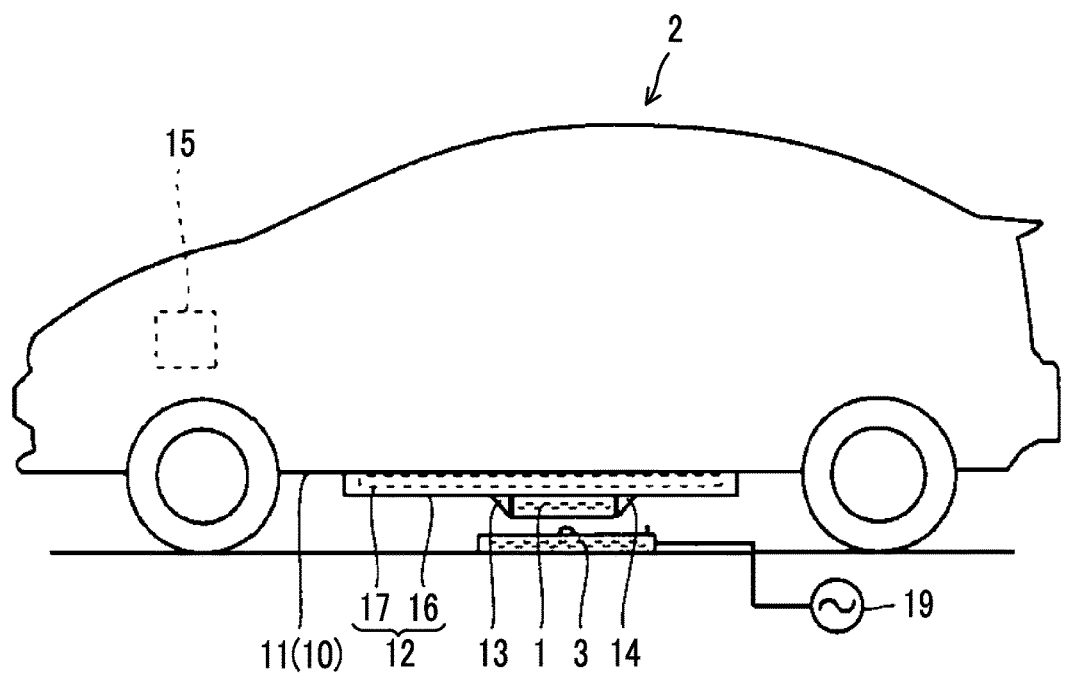
FIG. 1 is a schematic view schematically illustrating a vehicle including a power reception device, and a power transmission device.
Figure 1:
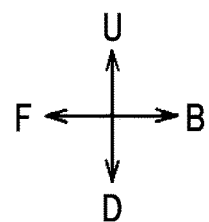

Embodiments 1 and 2 will be described by using FIGS. 1 to 12. In the configurations illustrated in FIGS. 1 to 12, the same reference numeral is assigned to the same or substantially the same configuration, and the description thereof will not be repeated. In FIGS. 1 to 12, "F" indicates a front direction of a vehicle; "B" indicates a back direction of a vehicle; "U" indicates an upward direction of a vertical direction; "D" indicates a downward direction of a vertical direction; "L" indicates a left direction of a vehicle; and "R" indicates a right direction of a vehicle.

Embodiment 1

FIG. 1 is a schematic view schematically illustrating a vehicle 2 including a power reception device 1, and a power transmission device 3. As illustrated in FIG. 1, the vehicle 2 includes the power reception device 1, a floor panel 11, a battery pack 12, a cushioning member 13, a cushioning member 14, and an accessory battery 15.

The floor panel 11 is a metallic plate-shaped member that forms a bottom surface 10 of the vehicle 2. The battery pack 12 includes a battery case 16, and a charging device 17 accommodated in the battery case 16. For example, the battery case 16 is formed of a metal such as aluminum. For example, the charging device 17 is a secondary battery or a capacitor which can be charged and discharged.

The accessory battery 15 is accommodated in an engine compartment of the vehicle 2. As the accessory battery 15, a lead storage battery or the like can be adopted.

The power reception device 1 is disposed on a lower surface of the battery case 16. The power reception device 1 receives electric power from the power transmission device 3 in a non-contact manner, and supplies the electric power to the charging device 11 or the accessory battery 15.

The cushioning member 13 and the cushioning member 14 are provided on the lower surface of the battery case 16. The cushioning member 13 is disposed in front of the power reception device 1, and the cushioning member 14 is disposed behind the power reception device 1. The cushioning members 13, 14 protect the power reception device 1 from a felling object or the like on a road surface.

The power transmission device 3 is disposed on the ground. A power supply 19 is connected to the power transmission device 3. The power transmission device 3 supplies electric power supplied from the power supply 19 to the power reception device 1 in a non-contact manner.

Figure 2:
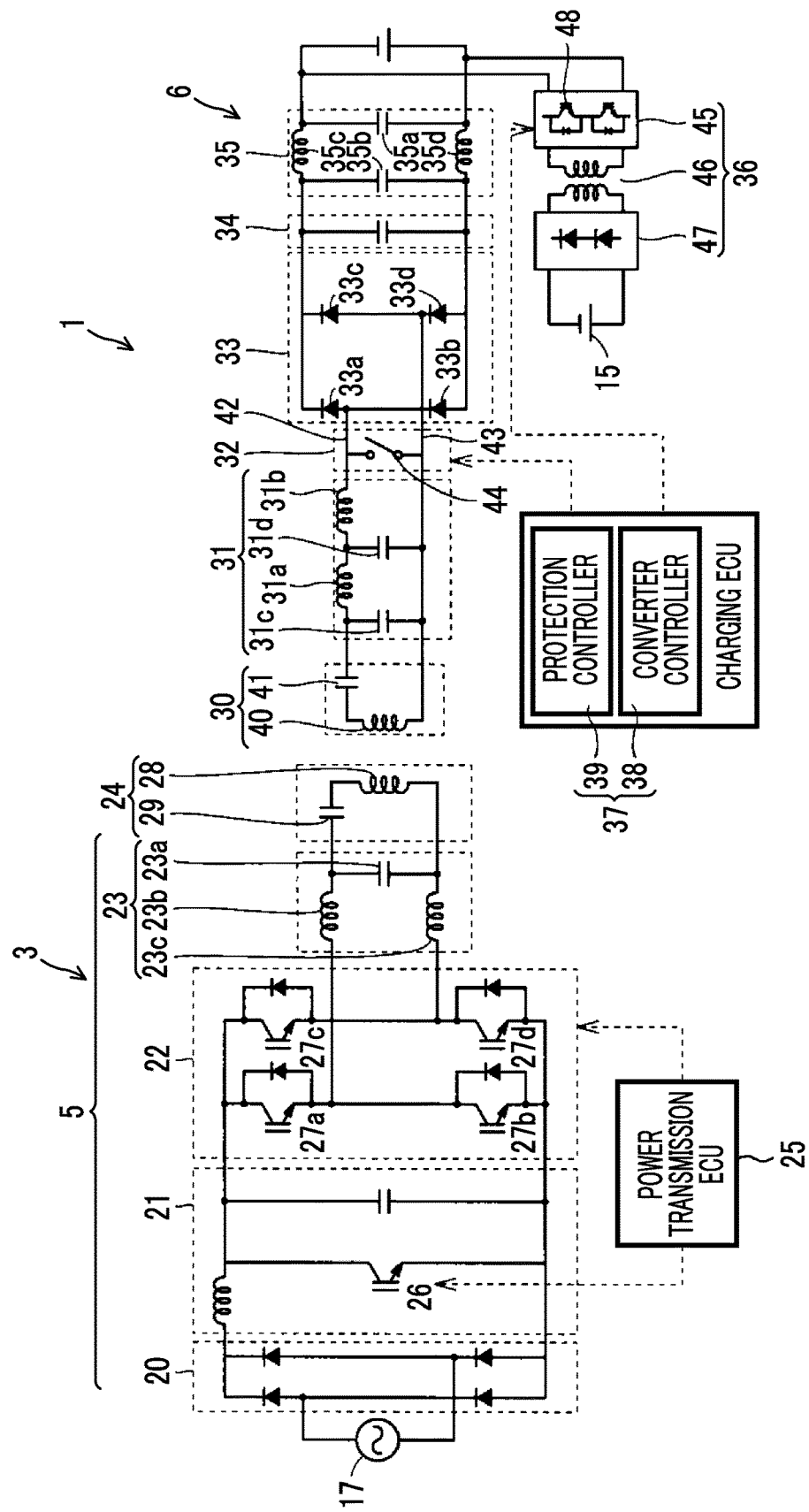
FIG. 2 is a circuit diagram schematically illustrating a circuit configuration of the power reception device and the power transmission device.

FIG. 2 is a circuit diagram schematically illustrating a circuit configuration of the power reception device 1 and the power transmission device 3. As illustrated in FIG. 2, the power transmission device 3 includes a power transmission unit 24 including a power transmission coil 28, a power-transmission-side electric unit 5 that is electrically connected to the power transmission coil 28, and a power transmission electronic control limit (ECU) 25.

In an example illustrated in FIG. 2, the power-transmission-side electric unit 5 includes a rectifier 20, a chopper circuit 21, an inverter 22, and a filter 23. The power-transmission-side electric unit 5 includes at least one active element. Specifically, the power transmission side electric unit 5 includes a switching element 26 provided in the chopper circuit 21, and a plurality of switching elements 27a to 27d provided in the inverter 22. The power-transmission-side electric unit 5 is not limited to the above-described electrical elements, and for example, may include a filter in a case where the filter is provided between the rectifier 20 and the rectifier 20.

The rectifier 20 is a diode bridge, and includes a plurality of diodes as passive elements. The rectifier 20 performs full-wave rectification on commercial electric power supplied from the power supply 19, and outputs the rectified electric power to the chopper circuit 21. The electric power output from the rectifier 20 is a monopolar pulsating current in which the sinusoidal wave of the commercial electric power is folded at the zero cross point.

The chopper circuit 21 is a boosting chopper circuit, and includes a coil, the switching element 26, a diode, and a capacitor. The switching element 26 is an active element, and is a metal-oxide-semiconductor field-effect transistor (MOSFET), for example. A switching operation of the switching element 26 is controlled according to a command from the power transmission ECU 25.

The chopper circuit 21 functions as a power factor correction (PFC) circuit. Specifically, the switching element 26 of the chopper circuit 21 performs switching based on the zero cross point of the full-wave rectified electric power with a frequency sufficiently higher than a frequency of the full-wave rectified electric power supplied from the rectifier 20. Accordingly, the conduction interval of a current of the full-wave rectified electric power is widened, and thus the power factor is corrected. The chopper circuit 21 supplies direct current electric power to the inverter 22.

The inverter 22 includes the switching elements 27a to 27d, and diodes which are respectively connected to the switching elements 27a to 27d in parallel.

The switching elements 27a to 27d are active elements, and are MOSFETs or Insulated Gate Bipolar Transistors (IGBTs), for example. The inverter 22 switches the switching elements 27a to 27d based on an inverter driving signal from the power transmission ECU 25, and supplies alternating current electric power to the filter 23.

The filter 23 includes a capacitor 23a, and filter coils 23b, 23c, and the filter 23 is formed of passive elements.

The filter 23 removes noise from the alternating current electric power supplied from the inverter 22, and supplies the power to the power transmission unit 24. Accordingly, it is possible to suppress the emission of electromagnetic interference (EMI) from the power transmission unit 24.

The power transmission unit 24 includes the power transmission coil 28 and a capacitor 29, and the power transmission unit 24 is formed of passive elements. The power transmission coil 28 and the capacitor 29 are connected in series. The power transmission coil 28 and the capacitor 29 form a serial LC resonator, and the Q factor of the power transmission unit 24 is equal to or greater than 100.

Alternating current electric power is supplied to the power transmission unit 24 from the titer 23. Since the alternating current flows in the power transmission unit 24, an electromagnetic field is formed in the vicinity of the power transmission unit 24.

The power reception device 1 includes a power reception unit 30 including a power reception coil 40, a power-reception-side electric unit 6 that is electrically connected to the power reception coil 40, and a charging ECU 37.

The power-reception-side electric unit 6 includes a filter 31, a short-circuit protection circuit 32, a rectifier 33, a smoothing circuit 34, a filter 35, a sub DC-DC converter 36, and an electric power line 42 and an electric power line 43 that connect the filter 31 and the rectifier 33.

The charging ECU 37 includes a converter controller 38 and a protection controller 39. The converter controller 38 controls the driving of the sub DC-DC converter 36, and the protection controller 39 controls the driving of the short-circuit protection circuit 32.

The power reception unit 30 includes the power reception coil 40 and a capacitor 41, and the power reception unit 30 is formed of passive elements. The power reception coil 40 and the capacitor 41 form a serial LC resonator, and the Q factor of the power reception unit 30 is equal to or greater than 100. The resonance frequency of the power transmission unit 24 is equal to or substantially equal to the resonance frequency of the power reception unit 30.

The power reception unit 30 receives electric power through the electromagnetic field formed in the vicinity of the power transmission unit 24, and the power reception unit 30 receives electric power from the power transmission unit 24 in a non-contact manner. The alternating current electric power received by the power reception unit 30 is supplied to the filter 31.

The filter 31 includes a plurality of filter coils 31a, 31b, and capacitors 31c, 31d, and the filter 31 is formed of passive elements.

The filter 31 removes noise from the alternating current electric power supplied from the power reception unit 30, and supplies the power to the short-circuit protection circuit 32.

The short-circuit protection circuit 32 includes a switching element 44 connected to the electric power line 42 and the electric power line 43 that connect the filter 31 and the rectifier 33. The switching element 44 is driven according to a control signal from the protection controller 39.

For example, in a case where the rectifier 33 or the like is normal, the switching element 44 of the short-circuit protection circuit 32 is in an OFF state, and the electric power line 42 and the electric power line 43 are in an electrically connected state.

In a case where abnormality is detected in the rectifier 33 or the like, the switching element 44 is turned ON according to the control signal from the protection controller 39, and electrically connects the electric power line 42 and the electric power line 43. The electric power line 42 and the electric power line 43 are electrically connected to form a short circuit, and thus it is possible to prevent the electric power received by the power reception unit 30 from flowing into the rectifier 33. Accordingly, electric power can be prevented from being supplied to the rectifier 33 in which abnormality occurs, and it is possible to protect the rectifier 33.

The rectifier 33 includes a plurality of diodes 33a to 33d, and the rectifier 33 is formed of passive elements.

The rectifier 33 converts the alternating current electric power that is supplied through the short-circuit protection circuit 32, into direst current electric power, and supplies the direct current electric power to the smoothing circuit 34.

The smoothing circuit 34 is formed of a capacitor, and the smoothing circuit 34 is formed of passive elements. The smoothing circuit 34 smooths the direct current electric power supplied from the rectifier 33 and supplies the power to the filter 35.

The filter 35 includes a plurality of capacitors 35a, 35b and a plurality of filter coils 35c, 35d, and the filter 35 is formed of passive elements. The filter 35 removes noise from the direct current electric power supplied from the smoothing circuit 34, and supplies the power to the charging device 17 and the sub DC-DC converter 36.

The sub DC-DC converter 36 Includes an inverter 45, a transformer 46 that is electrically connected to the inverter 45, and a rectifier 47 that is electrically connected to the transformer 46.

The inverter 45 includes a plurality of switching elements 48, and a plurality of diodes. The switching elements 48 are active elements, and are MOSFETs or IGBTs, for example. The inverter 45 switches the switching elements 48 ON and OFF based on the driving control signal from the converter controller 38. The inverter 45 converts the direct current electric power supplied from the filter 35 to alternating current electric power.

The transformer 46 includes two coils, and the transformer 46 is formed of passive elements. The transformer 46 converts (for example, lowers) the voltage of the alternating current electric power supplied from the inverter 45, and supplies the power to the rectifier 47.

The rectifier 47 includes a plurality of diodes, and the rectifier 47 is formed of passive elements. The rectifier 47 converts the alternating current electric power supplied from the transformer 46 into direct current electric power, and supplies the power to the accessory battery 15.

Figure 3:
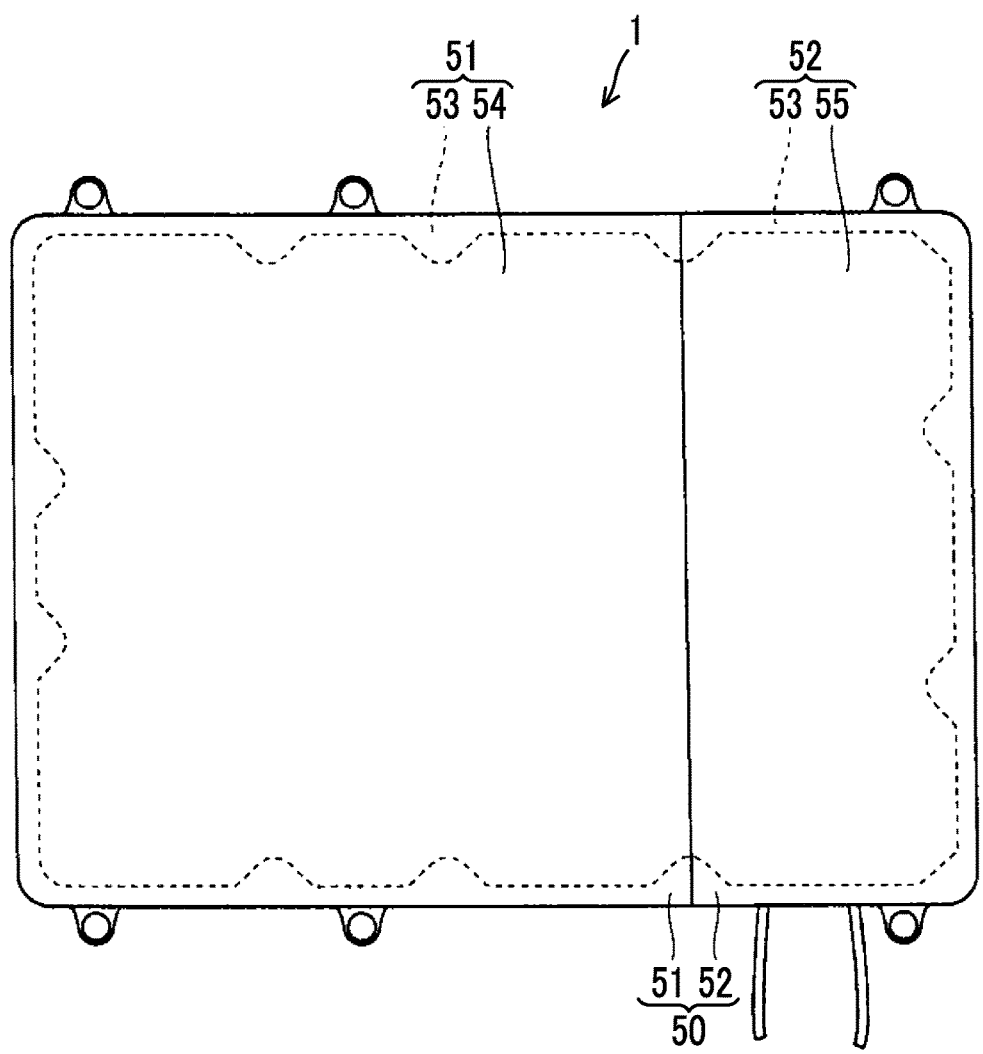
FIG. 3 is a plan view schematically illustrating the power reception device.

Next, a configuration of the power reception device 1 will be described by using FIG. 3 and the like. FIG. 3 is a plan view schematically illustrating the power reception device 1. As illustrated in FIG. 3, the power reception device 1 includes an accommodation case 50 that accommodates a power reception coil or various elements therein.

The accommodation case 50 includes a coil accommodation case 51 and a metal case 52. The accommodation case 50 includes a case main body 53, a resin lid 54, and a metal lid 55. The case main body 53 and the metal lid 55 are formed of a metal such as aluminum, and the resin lid 54 is formed of resin or the like.

The coil accommodation case 51 is formed of the case main body 53 and the resin lid 54. The metal case 52 is formed of the case main body 53 and the metal lid 55.

Figure 4:
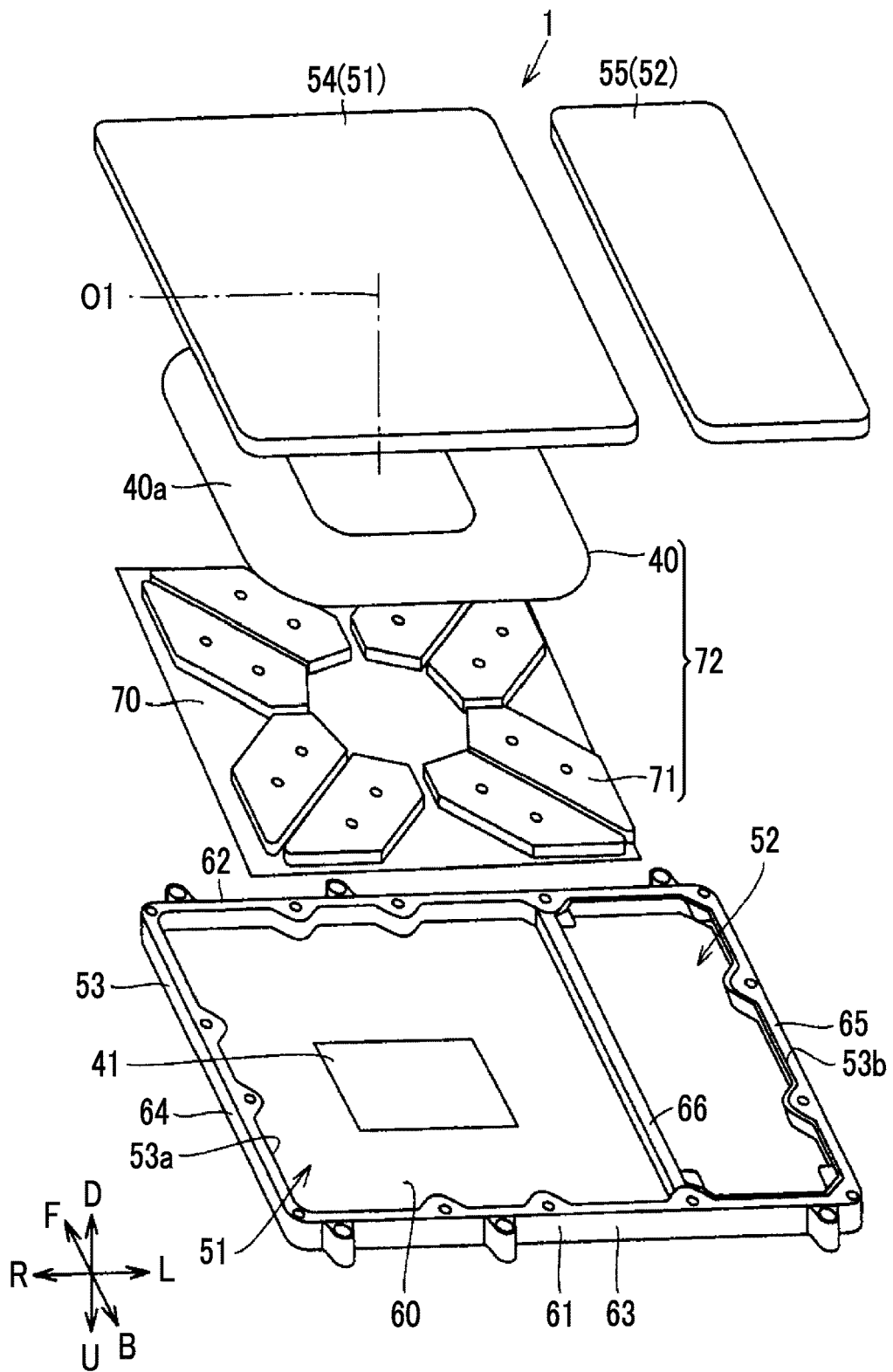
FIG. 4 is an exploded perspective view schematically illustrating the power reception device.

FIG. 4 is an exploded perspective view schematically illustrating the power reception device 1. As illustrated in FIG. 4, an opening portion 53a and an opening portion 53b that open downward are formed in the case main body 53. The opening portion 53a and the opening portion 53b are formed to be arranged in a width direction of the vehicle 2, and the opening portion 53b is formed on the left side of the opening portion 53a.

The case main body 33 includes a top plate 60, a peripheral wall 61, and an inner-side wall 66. The top plate 60 is disposed on the lower surface of the battery case 16. The peripheral wall 61 is formed to protrude downward from an outer peripheral edge portion of the top plate 60, and is formed in an annular shape along the outer peripheral edge portion of the top plate 60.

The peripheral wall 61 includes a front-side wall 62, a rear-side wall 63, a right-outer-side wall 64, and a left-outer-side wall 65. The front-side wall 62 is disposed on the front side of the vehicle 2. The rear-side wall 63 is disposed on the rear side of the vehicle 2. The right-outer-side wall 64 is disposed on the right side of the vehicle 2. The left-outer-side wall 65 is disposed on the left side of the vehicle 2.

The inner-side wall 66 is provided in the annular peripheral wall 61, and is formed to connect the front-side wall 62 and the rear-side wall 63.

The opening portion 53a is formed by a part of the front-side wall 62, the right-outer-side wall 64, a part of the rear-side wall 63, and the inner-side wall 66. Similarly, the opening portion 53b is formed by a part of the front-side wall 62, the left-outer-side wall 65, a part of the rear-side wall 63, and the inner-side wall 66.

The resin lid 54 is provided to cover the opening portion 53a. Since the resin lid 54 covers the opening portion 53b, the coil accommodation case 51 that accommodates the power reception coil 40 or the like therein is formed.

In this manner, the coil accommodation case 51 is formed by a part of the top plate 60, a part of the front-side wall 62, the inner-side wall 66, a part of the rear-side wall 63, the right-outer-side wall 64, and the resin lid 54.

The metal lid 55 is provided to cover the opening portion 53b. Since the metal lid 55 covers the opening portion 53b, the metal case 52 that accommodates the power-reception-side electric unit 6 therein is formed.

In this manner, the metal case 52 is formed by a part of the top plate 60, a part of the front-side wall 62, the left-center-side wall 65, apart of the rear-side wall 63, the inner-side wall 66, and the metal lid 55.

As illustrated in FIG. 4, the power reception device 1 includes a metal plate 70 that is formed in a plate shape, and a ferrite plate 71 disposed on a lower surface of the metal plate 70. The power reception coil 40 is disposed on a lower surface of the ferrite plate 71, and the power reception coil 40 and the ferrite plate 71 form a coil unit 72. The capacitor 41 is disposed on the upper surface side of the metal plate 70.

The capacitor 41 includes a base plate, and a plurality of ceramic capacitors provided on the base plate. The metal plate 70 is disposed between the capacitor 41 and the coil unit 72, and thus the electromagnetic field formed in the vicinity of the power reception coil 40 is prevented from reaching the capacitor 41.

The power reception coil 40 is a spiral coil. The power reception coil 40 is formed by winding a coil wire 40a such that the coil wire 40a surrounds a winding axis O1 extending in an up-down direction.

The ferrite plate 71 is formed in a plate shape, and the lower surface of the ferrite plate 71 is a coil mounting surface.

Figure 5:
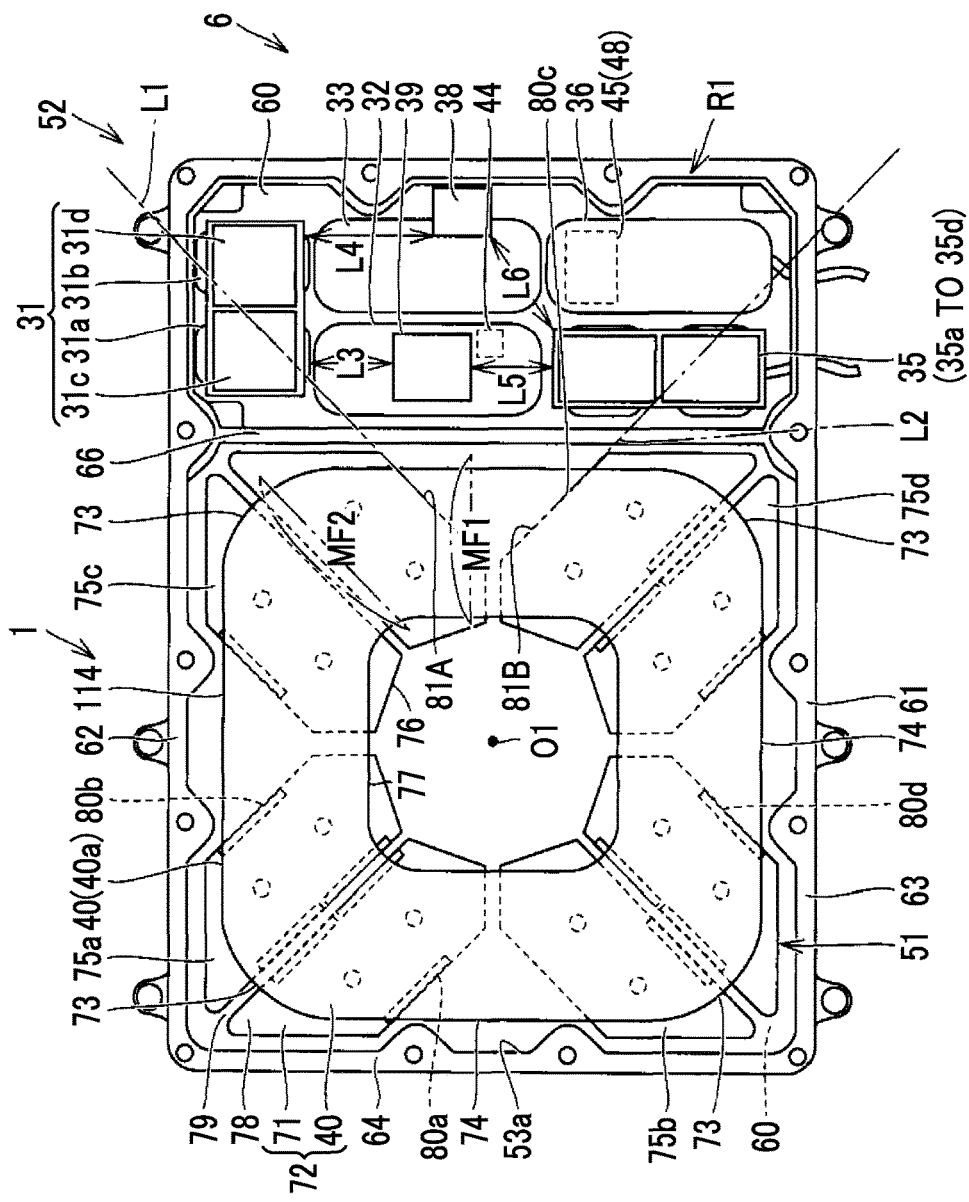

FIG. 5 is a plan view illustrating the power reception device 1. In FIG. 5, the lower surface (coil mounting surface) of the ferrite plate 71 is viewed in a plan view, in the power reception device 1 from which the resin lid 54 and the metal lid 55 are removed.

As illustrated in FIG. 5, the coil unit 72 is accommodated in the coil accommodation case 51, and the power-reception-side electric unit 6 is accommodated in the metal case 52.

The metal case 52 is provided to be adjacent to the coil unit 72 and the power reception coil 40. In an example illustrated in FIG. 5, the metal case 52 is provided to be adjacent to the coil unit 72 and the power reception coil 40, on the left side (in the width direction) of the vehicle 2.

Next, a configuration of the power reception coil 40 and the ferrite plate 71 accommodated in the coil accommodation case 51 will be described.

The power reception coil 40 is a spiral coil, and the power reception coil 40 is formed is a polygonal shape of which the corners are curved. In an example illustrated in FIG. 5, the power reception coil 40 is formed in a quadrangle shape.

The power reception coil 40 includes a plurality of bent sections 73, and straight sections 74, each of which connects the adjacent bent sections 73. A hole 77 is formed in the center of the power reception coil 40.

The ferrite plate 71 includes a plurality of angulated ferrite plates 75a to 75d, and the angulated ferrite plates 75a to 75d are provided to surround the winding axis O1. The angulated ferrite plates 75a to 75d are disposed in an annular shape with intervals, and a hole 76 is formed in the center of the ferrite plate 71.

The angulated ferrite plates 75a, 75b are disposed to be adjacent to the right-outer-side wall 64, and the angulated ferrite plate 75a and the angulated ferrite plate 75c are disposed to be adjacent to the front-side wall 62. Similarly, the angulated ferrite plate 75c and the angulated ferrite plate 75d are disposed to be adjacent to the inner-side wall 66, and the angulated ferrite plate 75b and the angulated ferrite plate 75d are disposed to be adjacent to the rear-side wall 63.

When the lower surface (coil mounting surface) of the ferrite plate 71 is seen in a plan view, each of the angulated ferrite plates 75a to 75d is disposed on the upper surface side of the bent sections 73 of the power reception coil 40. The angulated ferrite plates 75a to 75d are disposed to radially extend with the winding axis O1 as the center. An inner end portion, on the winding axis O1 side, of each of the angulated ferrite plates 75a to 75d is exposed from the hole 77 of the power reception coil 40. An outer end portion of each of the angulated ferrite plates 75a to 75d protrudes outward in relation to each bent section 73.

In the example illustrated in FIG. 5, each of the angulated ferrite plates 75a to 75d includes two split ferrite plates 78. The split ferrite plates 78 are disposed with an interval and a gap 79 is formed between the split ferrite plates 78. The gap 79 radially extends with the winding axis O1 as the center.

A plurality of notches 80a to 80d is formed on the ferrite plate 71. When the coil unit 72 is seen in a direction in which the lower surface (coil mounting surface) of the ferrite plate 71 is seen in a plan view, the notches 80a to 80d are formed to respectively overlap the straight sections 74 of the power reception coil 40. The notches 80a to 80d are formed by the adjacent angulated ferrite plates 75a to 75d.

Specifically, the notch 80a is formed between the angulated ferrite plate 75a and the angulated ferrite plate 75b, and the notch 80a is formed at a position adjacent to the right-outer-side wall 64. The notch 80b is formed between the angulated ferrite plate 75a and the angulated ferrite plate 75c, and the notch 80b is formed at a position adjacent to the front-side wall 62.

The notch 80c is formed between the angulated ferrite plate 75c and the angulated ferrite plate 75d, and the notch 80c is formed at a position adjacent to the inner-side wall 66. The notch 80d is formed between the angulated ferrite plate 75d and the angulated ferrite plate 75b, and the notch 80d is formed at a position adjacent to the rear-side wall 63.

The width of each of the notches 80a to 80d in a direction in which the coil wire 40a extends, is formed to be increased from an inner peripheral edge portion side to an outer peripheral edge portion side of the power reception coil 40. For example, the width of the notch 80c is formed to be increased the more the notch 80c is toward the inner-side wall 66.

Next, mounting positions of the power-reception-side electric unit 6, the converter controller 38, and the protection controller 39 that are accommodated in the metal case 52 will be described.

The filter 31 is disposed on the front-side wall 62 in the metal case 52. Specifically, the filter coils 31a, 31b are disposed on the top plate 60, and the capacitors 31c, 31d are disposed below the filter coils 31a, 31b.

The filter coil 31a and the filter coil 31b are disposed to be arranged in the width direction of the vehicle 2.

The short-circuit protection circuit 32 and the rectifier 33 are disposed behind the filter 31 in the vehicle 2. The short-circuit protection circuit 32 is disposed to be closer to the inner-side wall 66 than the rectifier 33. The switching element 44 of the short-circuit protection circuit 32 is provided at a position closer to the inner-side wall 66 than to the left-outer-side wall 65.

The filter 35 and the sub DC-DC converter 36 are disposed behind the short-circuit protection circuit 32 and the rectifier 33 in the vehicle 2. The filter 35 is provided at a position closer to the inner-side wall 66 than the sub DC-DC converter 36. Therefore, the sub DC-DC converter 36 is provided at a position farther from the power reception coil 40 than the filter 35.

In the filter 35, the filter coils 35c, 35d are disposed on the top plate 60, and the capacitors 35a, 35b are disposed below the filter coils 35c, 35d.

Here, the inner peripheral edge portion of the notch 80c includes a side 81A and a side 81B. The side 81A is a side of the angulated ferrite-plate 75c, and the side 81B is a side of the angulated ferrite plate 75d.

Here, in FIG. 5, a "virtual straight line L1" is an extension line of the side 81A, a "virtual straight line L2" is an extension line of the side 81B. An adjacent area R1 is an area interposed between the virtual straight line L1 and the virtual straight line L2.

Although the details will be described below, in the area that is interposed between the virtual straight line L1 and the virtual straight line L2, and is in the metal case 52 (the adjacent area R1 that is adjacent to the notch 80c and is in the metal case 52), an electromagnetic field which has relatively low strength is distributed during the power reception.

The switching element 44 of the short-circuit protection circuit 32 and the switching elements 48 of the sub DC-DC converter 36 are disposed in the adjacent area R1 adjacent to the notch 80c, in the metal case 52. Therefore, it is possible to suppress the exposure of the switching element 44 and the switching elements 48 to an electromagnetic field having high strength, during the power reception.

When the power reception devise 1 configured as described above receives electric power from the power transmission device 3 in a non-contact manner, a flux emitted from the power transmission device 3 is linked with the power reception coil 40. Accordingly, an alternating current flows in the power reception coil 40. When an alternating current flows in the power reception coil 40, an electromagnetic field is formed in the vicinity of the power reception coil 40, and a flux is emitted from the power reception coil 40. The flux emitted from the power reception coil 40 is linked with the power transmission coil 28 and returns to the power reception coil 40.

In this manner, the power reception coil 40 receives electric power by the flux passing through the power reception coil 40 and the power transmission coil 28.

In FIG. 5, a magnetic path MF1 is a path passing through an inner end of the angulated ferrite plate 75c, a portion below the power reception coil 40, an outer peripheral end side of the power reception coil 40, and a portion in the notch 80c.

A magnetic path MF2 is a path passing through an inner end of the angulated ferrite plate 75c, a portion below the power reception coil 40, an outer end of the angulated ferrite plate 75c, and a portion in the angulated ferrite plate 75c.

Since the magnetic path MF1 passes through a portion in the notch 80c, the path length of the magnetic path MF1 passing through the air is longer than the path length of the magnetic path MF2 passing through the air.

Since the magnetic resistance of the air is much higher than the magnetic resistance of the ferrite, the magnetic resistance of the magnetic path MF1 is higher than the magnetic resistance of the magnetic path MF2. As a result, the amount of the flux passing through the magnetic path MF1 is smaller than the amount of the flux passing through the magnetic path MF2, and the amount of the flux passing through the magnetic path MF2 is large.

Since the distance of the magnetic path MF2 passing through the portion below the power reception coil 40 is longer than that of the magnetic path MF1 passing through the portion below the power reception coil 40, when the flux passing through the magnetic path MF1 is increased, the flux passing through a portion greatly distant from the power reception coil 40 downward is likely to be increased. As a result, the flux linked with the power transmission coil 28 that is positioned below the power reception coil 40 is increased. In this manner, since the notches 80a to 80d are formed on the ferrite plate 71, it is possible to increase the flux linked with the power reception coil 40 and the power transmission coil 28, and thus the coupling coefficient is improved.

The flux linked with both the power reception coil 40 and the power transmission coil 28 mainly passes through the inner ends of the angulated ferrite plates 75a to 75d, the power transmission cod 28, the outer ends of the angulated ferrite plates 75a to 75d, and portions in the angulated ferrite plates 75a to 75d.

Meanwhile, when the power reception coil 40 receives electric power, the amount of the flux passing through the portions in the notches 80a to 80d and a region adjacent to the notches 80a to 80d is small.

Figure 6:
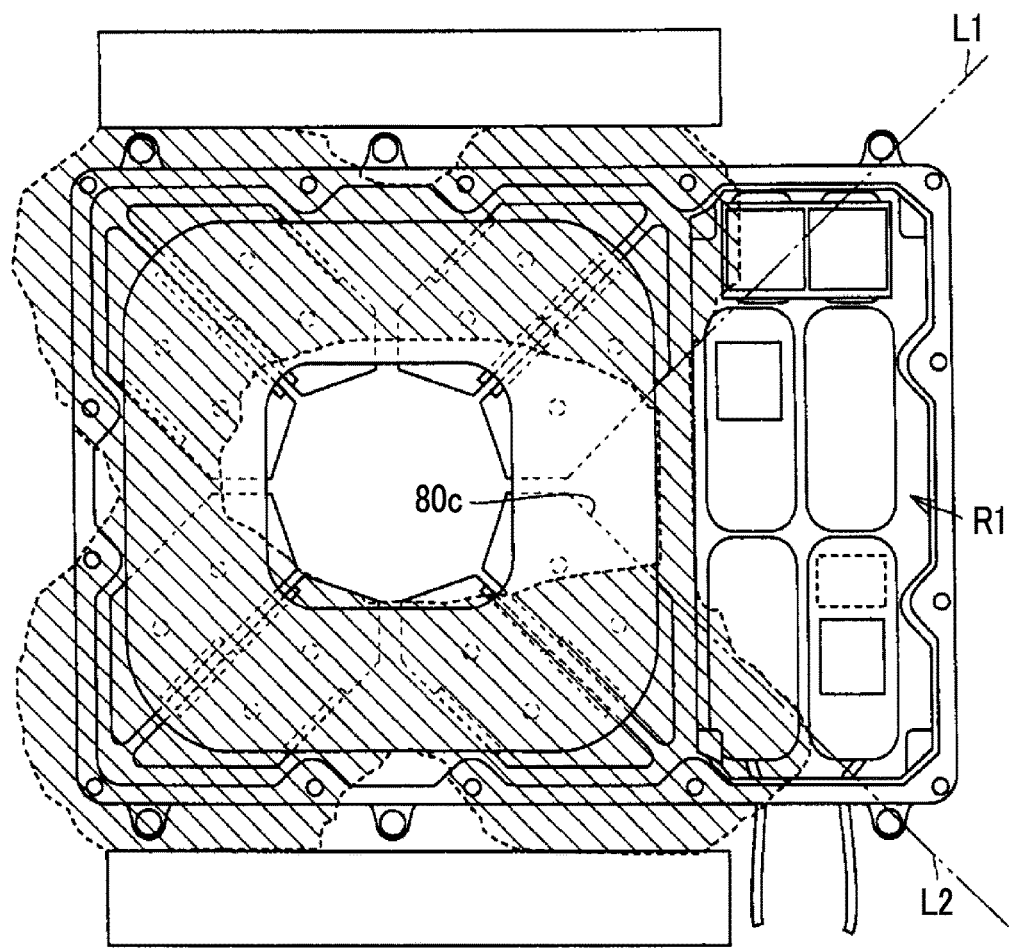
FIG. 6 is a plan view schematically illustrating a strength distribution of the magnetic field in the vicinity of a power reception coil during power reception.

FIG. 6 is a plan view schematically illustrating a strength distribution of the magnetic field in the vicinity of the power reception coil 40 during the power reception. In FIG. 6, a region indicated by diagonal lines indicates a region in which the strength of the electromagnetic field is high. As illustrated in FIG. 6, it can be known that the strength of the electromagnetic field is relatively low in the area interposed between the virtual straight line L1 and the virtual straight line L2 (the adjacent area R1 adjacent to the notch 80c) in the metal case 52.

In FIG. 5, since the switching element 44 and the switching elements 48 are disposed in the adjacent area R1 adjacent to the notch 80c, it is possible to suppress the exposure of the switching elements 44, 48 to the electromagnetic field having high strength.

In the embodiment, all the switching element 44 and the switching elements 48 which are active elements and are provided in the power-reception-side electric unit 6 are disposed in the adjacent area R1 adjacent to the notch 80c. However, at least one of the switching element 44 and the switching elements 48 may be disposed in the adjacent area R1 adjacent to the notch 80c.

The switching elements 48 of the inverter 45 are disposed at positions closer to the left-outer-side wall 65 than to the inner-side wall 66. During the power reception, the strength of the electromagnetic field formed in the vicinity of the power reception coil 40 becomes weak as the distance from the power reception coil 40 is increased. Therefore, even in the adjacent area R1, the strength of the electromagnetic field becomes low as the distance from the power reception coil 40 is increased, and thus it is possible to suppress the exposure of the switching elements 48 to the electromagnetic field having high strength.

The protection controller 39 and the converter controller 38 are disposed in the adjacent area R1 in the coil accommodation case 51. Therefore, it is possible to suppress the exposure of the protection controller 39 and the converter controller 38 to the electromagnetic field having high strength, during the power reception.

During the power reception, a current flows in the filter coils 31a, 31b of the filter 31, and a current also flows in the filter coils 35c, 35d. Thus, the electromagnetic field is formed in the vicinity of the filter coils 31a, 31b and the vicinity of the filter coils 35c, 35d.

A distance L4 between the converter controller 38 and the filter 31 is longer than a distance L3 between the protection controller 39 and the filter 31. Therefore, the strength of the electromagnetic field to which the converter controller 38 is exposed due to the electromagnetic field formed in the vicinity of the filter 31 is lower than the strength of the electromagnetic field to which the protection controller 39 is exposed.

A distance L6 between the converter controller 38 and the filter 35 is longer than a distance L5 between the protection controller 39 and the filter 35. Therefore, the strength of the electromagnetic field to which the converter controller 38 is exposed due to the electromagnetic field formed in the vicinity of the filter 35 is lower than the strength of the electromagnetic field to which the protection controller 39 is exposed.

The strength of the electromagnetic field to which the converter controller 38 is exposed is lower than the strength of the electromagnetic field to which the protection controller 39 is exposed. During the power reception, the converter controller 38 is almost usually driven. Meanwhile, the protection controller 39 is driven when abnormality occurs in the rectifier 33, during the power reception.

In this manner, during the power reception, the converter controller 38 has more opportunities of being driven than the protection controller 39. Therefore, in the embodiment, the electromagnetic field to which the converter controller 38 is exposed is reduced, and thereby the protection for the converter controller 38 is achieved.

Figure 7:
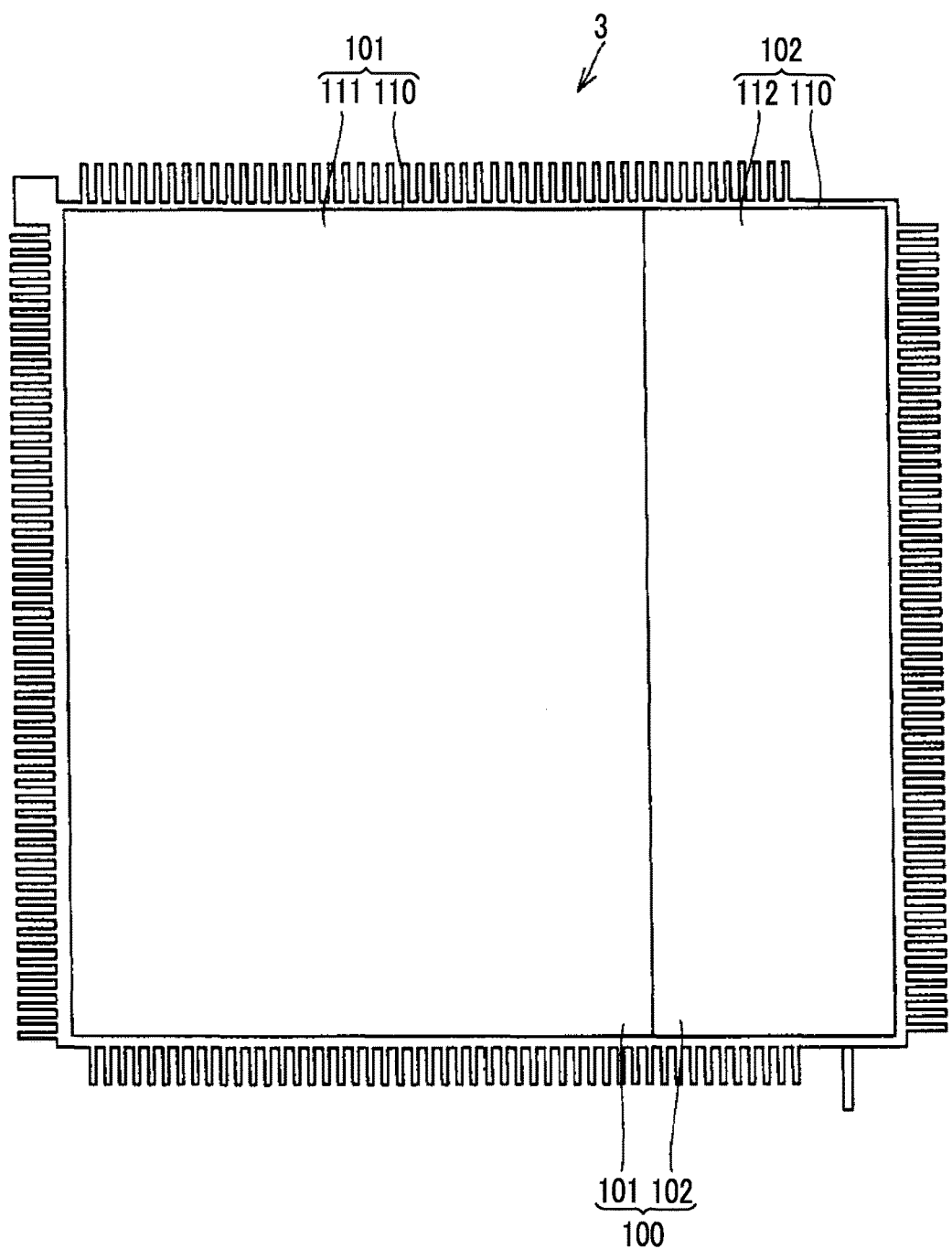
FIG. 7 is a plan view illustrating the power transmission device.

A configuration of the power transmission device 3 or the like will be described. FIG. 7 is a plan view illustrating the power transmission device 3. As illustrated in FIG. 7, the power transmission device 3 includes an accommodation case 100 in which the power transmission unit 24 and the power-transmission-side electric unit 5 are accommodated.

The accommodation case 100 includes a coil accommodation case 101, and a metal case 102. The coil accommodation case 101 includes a case main body 110, and a resin lid 111. The metal case 102 includes the case main body 110, and a metal lid 112.

Figure 8:
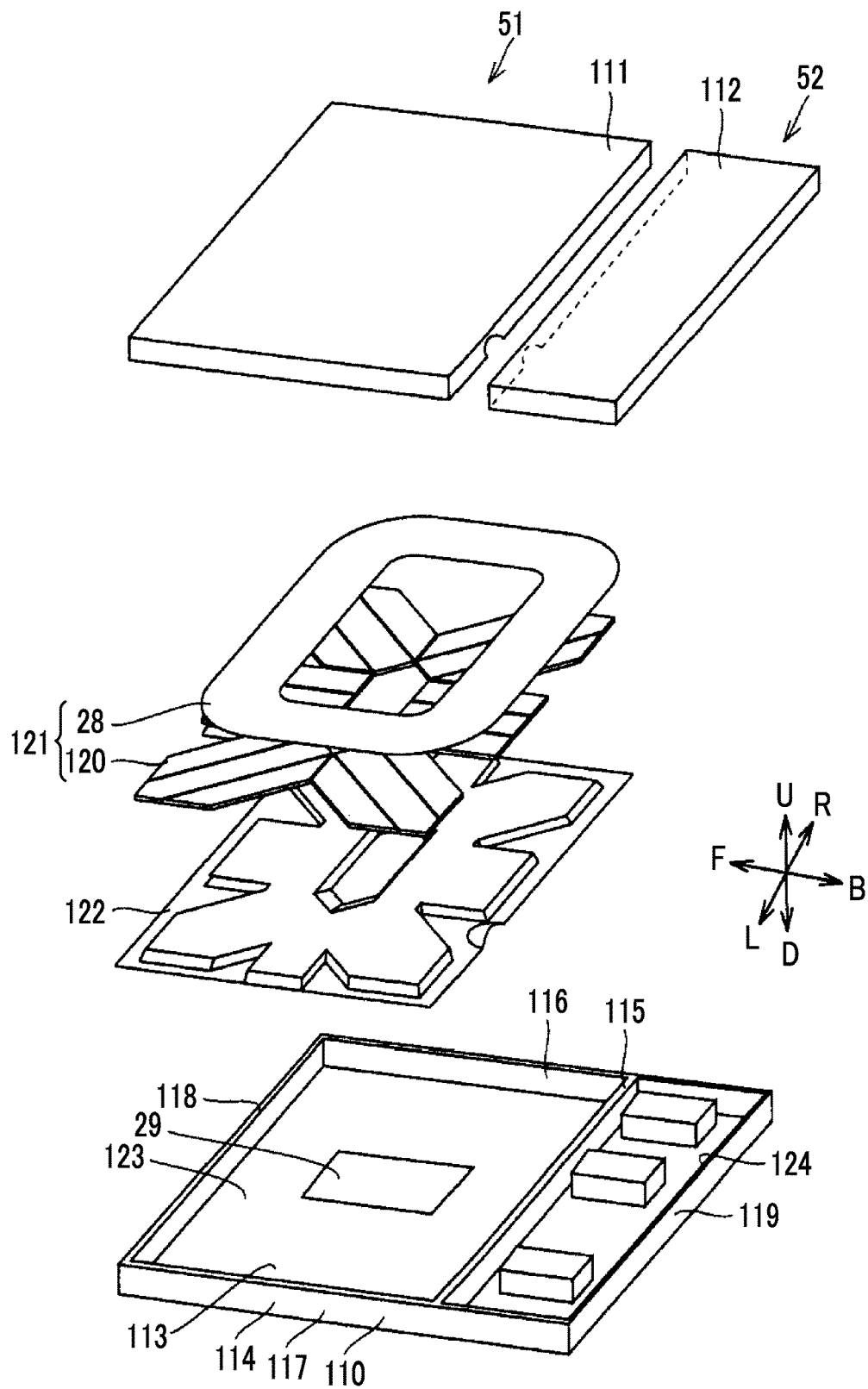
FIG. 8 is an exploded perspective view illustrating the power transmission device.

FIG. 8 is an exploded perspective view illustrating the power transmission device 3. As illustrated in FIG. 3, the power transmission device 3 includes a ferrite plate 120 on which the power transmission coil 28 is disposed, and a metal plate 122 that is disposed on a lower surface side of the ferrite plate 120.

The power transmission coil 28 is disposed on an upper surface of the ferrite plate 120, and the upper surface of the ferrite plate 120 is a mounting surface of the power transmission coil 28. The power transmission coil 28 and the ferrite plate 120 form a coil unit 121. The capacitor 29 is disposed on a lower surface side of the metal plate 122. The coil unit 121, the metal plate 122, and the capacitor 29 are accommodated in the coil accommodation case 51.

The case main body 110 includes a bottom plate 113, a peripheral wall 114, and an inner wall 115. The peripheral wall 114 is formed to protrude upward from an outer peripheral edge of the bottom plate 113.

The peripheral wall 114 includes an outer-side wall 116 that is positioned on the right side of the vehicle, an outer-side wall 117 that is positioned on the left side of the vehicle, an outer-side wall 118 that is positioned on the front side of the vehicle, and an outer-side wall 119 that is positioned on the rear side of the vehicle. The inner wall 115 is formed to connect the outer-side wall 116 and the outer-side wall 117.

An opening portion 123 is formed by a part of the outer-side wall 116, the outer-side wall 118, a part of the outer-side wall 117, and the inner wall 115. Similarly an opening portion 124 is formed by a part of the outer-side wall 116, the outer-side wall 119, a part of the outer-side wall 117, and the inner wall 115.

The resin lid 111 covers the opening portion 123, and thereby the coil accommodation case 51 is formed. The metal lid 112 covers the opening portion 124, and thereby the metal case 52 is formed.

Figure 9:
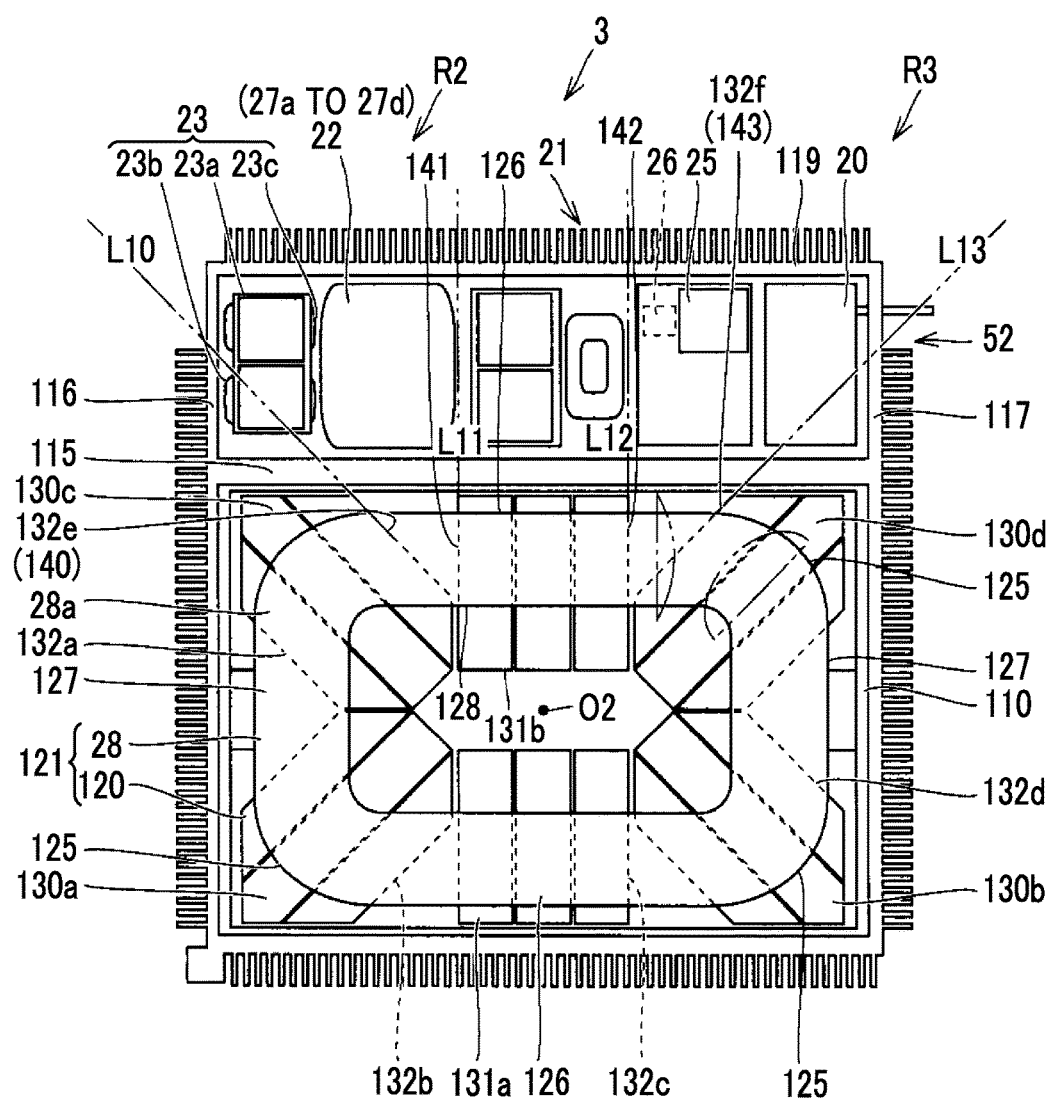
FIG. 9 is a plan view illustrating the power transmission device.

FIG. 9 is a plan view illustrating the power transmission device 3. FIG. 9 is a plan view in a state where the resin lid 111 and the metal lid 112 are removed from the power transmission device 3. As illustrated in FIG. 9, the metal case 52 is disposed at a position adjacent to the coil unit 121.

The power transmission coil 28 includes a plurality of bent sections 125, a pair of long side sections 126, and a pair of short side sections 127. The power transmission coil 28 is formed in a hollow shape, and a hole 128 is formed in the center of the power transmission coil 28. The power transmission coil 28 is a spiral coil. The power transmission coil 28 is formed by winding a coil wire 28a such that the coil wire 28a surrounds a winding axis O2 extending in the up-down direction.

The ferrite plate 126 includes a plurality of angulated ferrites 130a to 130d, and a plurality of side ferrites 131a, 131b. Each of the angulated ferrites 130a to 130d is formed of three split ferrites, and each of the side ferrites 131a, 131b is formed of three split ferrites.

When the ferrite plate 120 and the power transmission coil 28 are seen in a direction in which the upper surface of the ferrite plate 120 is seen in a plan view, the angulated ferrites 130a to 130d are disposed below the bent sections 125. The side ferrites 131a, 131b are disposed below the long side sections 126.

An inner end portion of each of the angulated ferrites 130a to 130d and an inner end portion of each of the side ferrites 131a, 131b are positioned inward in relation to the inner peripheral edge portion of the power transmission coil 28. An outer end portion of each of the angulated ferrites 130a to 130d and an outer end portion of each of the side ferrites 131a, 131b protrude outward in relation to the outer peripheral edge portion of the power transmission coil 28.

The angulated ferrites 130a to 130d and the side ferrites 131a, 131b are radially disposed. A plurality of notches 132a to 132f is formed on the outer peripheral edge portion of the ferrite plate 120.

When the ferrite plate 120 and the power transmission coil 28 are seen in a plan view in a direction in which the upper surface of the ferrite plate 120 is seen in a plan view, the notches 132a to 132f are formed to respectively overlap the long side sections 126 or the short side sections 127.

The notches 132a to 132f are formed such that a length of each of the notches 132a to 132f in a direction in which the coil wire 28a extends is increased the more the notches 132a to 132f are toward the outer peripheral edge from the inner peripheral edge of the power transmission coil 28. The notch portions 132e, 132f are formed at positions adjacent to the inner wall 115.

Specifically, the notch portion 132e formed between the angulated ferrite 130c and the side ferrite 131b.

The inner peripheral edge portion of the notch portion 132e includes a side 140 of the angulated ferrite 130c, and a side 141 of the side ferrite 131b.

The inner peripheral edge portion of the notch portion 132f is formed by a side 142 of the side ferrite 131b, and a side 143 of the angulated ferrite 130d.

In FIG. 9, a virtual straight line L10 is an extension line of the side 140, and a virtual straight line L11 is an extension line of the side 141. In addition, a virtual straight line L12 is an extension line of the side 142, and a virtual straight line L13 is an extension line of the side 143.

An adjacent area R2 adjacent to the notch portion 132e in the metal case 52 is an area interposed between the virtual straight line L10 and the virtual straight line L11 in the metal case 52. An adjacent area R3 adjacent to the notch portion 132f in the metal case 52 is an area interposed between the virtual straight line L12 and the virtual straight line L13 in the metal case 52.

In the metal case 52, the filter 23 is disposed at a position adjacent to the outer-side wall 116.

The inverter 22 is disposed to be closer to the outer-side wall 117 than the filter 23. The capacitor of the chopper circuit 21 is disposed to be closer to the outer-side wall 117 than the inverter 22. The coil of the chopper circuit 21 is disposed to be closer to the outer-side wall 117 than the capacitor. The switching element 26 of the chopper circuit 21 is disposed to be closer to the outer-side wall 117 than the coil of the chopper circuit 21, and the switching element 26 is disposed at a position closer to the outer-side wall 119 than to the inner wall 115.

The rectifier 20 is disposed to be closer to the outer-side wall 117 than the switching element 26 of the chopper circuit 21.

The switching elements 27a to 2d of the inverter 22 are disposed in the adjacent area R2, and the switching element 26 of the chopper circuit 21 is disposed in the adjacent area R3. The power transmission ECU 25 is disposed in the adjacent area R3.

In the power transmission device 3 configured as described above, when the power transmission device 3 transmits power, a current flows in the power transmission coil 28, and an electromagnetic field is formed in the vicinity of the power transmission coil 28.

The flux linked with both the power transmission coil 28 and the power reception coil 40 mainly passes through the inner end portions of the angulated ferrites 130a to 130d and the side ferrites 131a, 131b. the power reception coil 40, and the outer end portions of the angulated ferrites 130a to 130d and the side ferrites 131a, 131b. That is, the amount of the flux passing through each of the notches 132a to 132f is small, and the strength of the electromagnetic field distributed in each of the notches 132a to 132f is low during the power transmission.

In the embodiment, the switching elements 27a to 27d and the switching element 26 which are active elements of the power-transmission-side electric unit 5 are disposed in the adjacent area R2 or the adjacent area R3.

Therefore, it is possible to suppress the exposure of the switching elements 27a to 27d and the switching element 26 of the power-transmission-side electric unit 5 to the electromagnetic field having high strength, during the power transmission.

The power transmission ECU 25 is also disposed in the adjacent area R3, and thus the exposure of the power transmission ECU 25 to the electromagnetic field having high strength is suppressed.

Furthermore, the switching element 26 and the power transmission ECU 25 are disposed at positions closer to the outer-side wall 119 than to the inner wall 115, and the distance between the switching element 26 and the power transmission coil 28 is long. Therefore, the strength of the electromagnetic field to which the switching element 26 and the power transmission ECU 25 are exposed is suppressed to be low.

In Embodiment 1, the power reception device and the power transmission device in which the notches are formed in the ferrite plate are described. However, the notches are not essential configurations.

Embodiment 2

Figure 10:
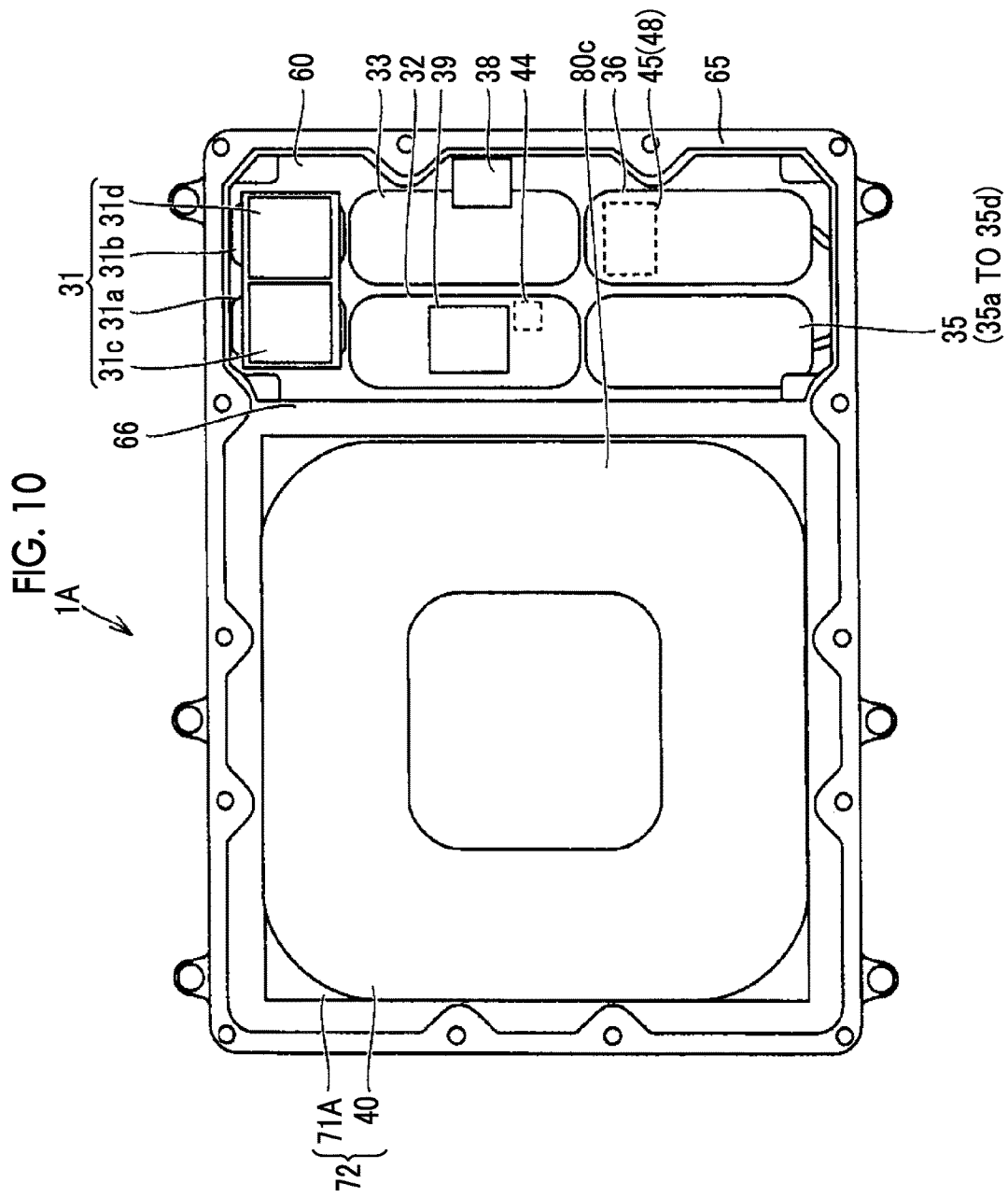
FIG. 10 is a plan-view illustrating a power reception device according to Embodiment 2.

FIG. 10 is a plan view illustrating a power reception device 1A according to Embodiment 2. FIG. 10 illustrates a state in which the resin lid and the metal lid are removed from the power reception device.

As illustrated in FIG. 10, the power reception device 1A includes a ferrite plate 71A, and the ferrite plate 71A is formed in a quadrangle shape.

In the embodiment, the switching elements 48 of the inverter 45 and the converter controller 38 are disposed at positions closer to the left-outer-side wall 65 than to the inner-side wall 66.

In the power reception device 1A configured as described above, when a reception current flows in the power reception coil 40 during the power reception, an electromagnetic field is formed in the vicinity of the power reception coil 40.

In Embodiment 2, since the notch portions are not formed in the ferrite plate 71A, the electromagnetic field is distributed along the outer periphery of the power reception coil 40, and the strength of the electromagnetic field becomes low as the distance from the power reception coil 40 is increased.

Meanwhile, the switching elements 48 of the sub DC-DC converter 36 are disposed at positions closer to the left-outer-side wall 65 than to the inner-side wall 66, and thus the exposure of the switching elements 48 to the electromagnetic field having high strength during the power reception is suppressed.

In Embodiment 2, the switching element 44 of the short-circuit protection circuit 32 is disposed at a position closer to the inner-side wall 66 than to the left-outer-side wall 65. However, the switching element 44 may be disposed at a position closer to the left-outer-side wall 65 than to the inner-side wall 66.

In this manner, in the power reception device 1A according to Embodiment 2, at least one of a plurality of active elements provided in the power-reception-side electric unit 6 is disposed at a position closer to the left-outer-side wall 65 than to the inner-side wall 66, and thereby the exposure of the corresponding active element to the electromagnetic field having high strength is suppressed.

Similar to Embodiment 1, also in Embodiment 2, the distance between the converter controller 38 and the filter 31 is longer than the distance between the protection controller 39 and the filter 31, and the exposure of the converter controller 38 to the electromagnetic field having high strength due to the electromagnetic field formed in the vicinity of the filter 31 is suppressed. In addition, the distance between the converter controller 38 and the filter 35 is longer than the distance between the protection controller 39 and the filter 35, and the exposure of the converter controller 38 to the electromagnetic field having high strength due to the electromagnetic field formed in the vicinity of the filter 35 can be suppressed.

Figure 11:
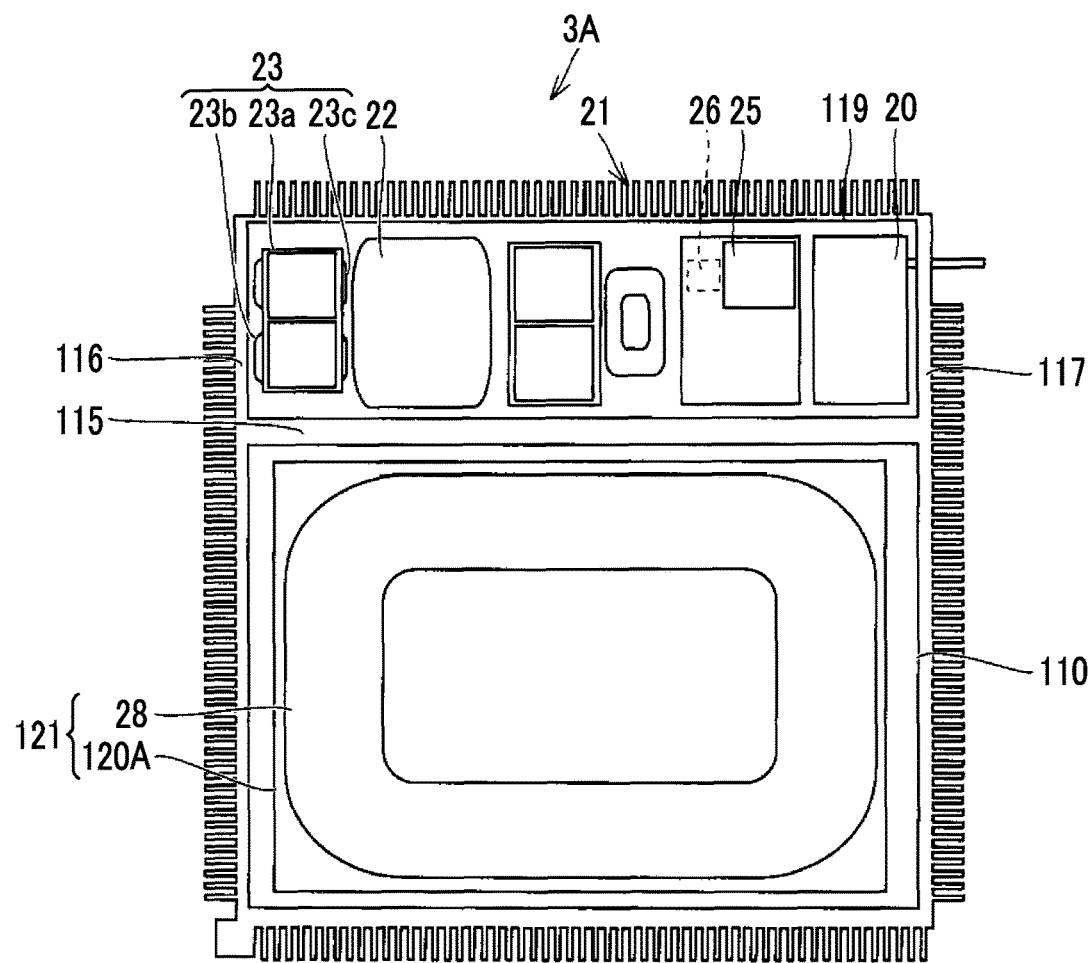
FIG. 11 is a plan view illustrating a power transmission device according to Embodiment 2.

Next, a power transmission device 3A according to Embodiment 2 will be described. FIG. 11 is a plan view illustrating the power transmission device 3A according to Embodiment 2. As illustrated in FIG. 11, the power transmission device 3A includes a ferrite plate 120A that is formed in a plate shape, and the power transmission coil 28 is disposed, on an upper surface of the ferrite plate 120A.

The ferrite plate 120A is formed in a quadrangle shape, and a notch is not formed in an outer peripheral edge of the ferrite plate 120A.

Various elements of the power-transmission-side electric unit 5 are accommodated in the metal case 102. The switching element 26 of the chopper circuit 21 and the power transmission ECU 25 are disposed at positions closer to the outer-side wall 119 than to the inner wall 115.

In the power transmission device 3A according to Embodiment 2, during the power transmission, a current flows in the power transmission coil 28, and an electromagnetic field is formed in the vicinity of the power transmission coil 28. Since a notch is not formed in the ferrite plate 120A, the strength of the electromagnetic field formed in the vicinity of the power transmission coil 28 becomes low as the distance from the power transmission coil 28 is increased.

In the power transmission device 3A according to Embodiment 2, since the switching element 26 and the power transmission ECU 25 are disposed at positions closer to the outer-side wall 119 than to the inner wall 115, it is possible to suppress the exposure of the switching element 26 and the power transmission ECU 25 to the electromagnetic field having high strength due to the electromagnetic field formed in the vicinity of the power transmission coil 28.

In this manner, in the power transmission device 3A according to Embodiment 2, at least one of a plurality of active elements provided in the power-transmission-side electric unit 5 is disposed at a position closer to the outer-side wall 119 than to the inner wall 115, and thereby it is possible to suppress the exposure of the corresponding active element to the electromagnetic field having high strength.

In Embodiments 1 and 2, the power reception devices 1, 1A and the power transmission devices 3, 3A in which a spiral coil is adopted are described. However, various coil types can be adopted.

Figure 12:
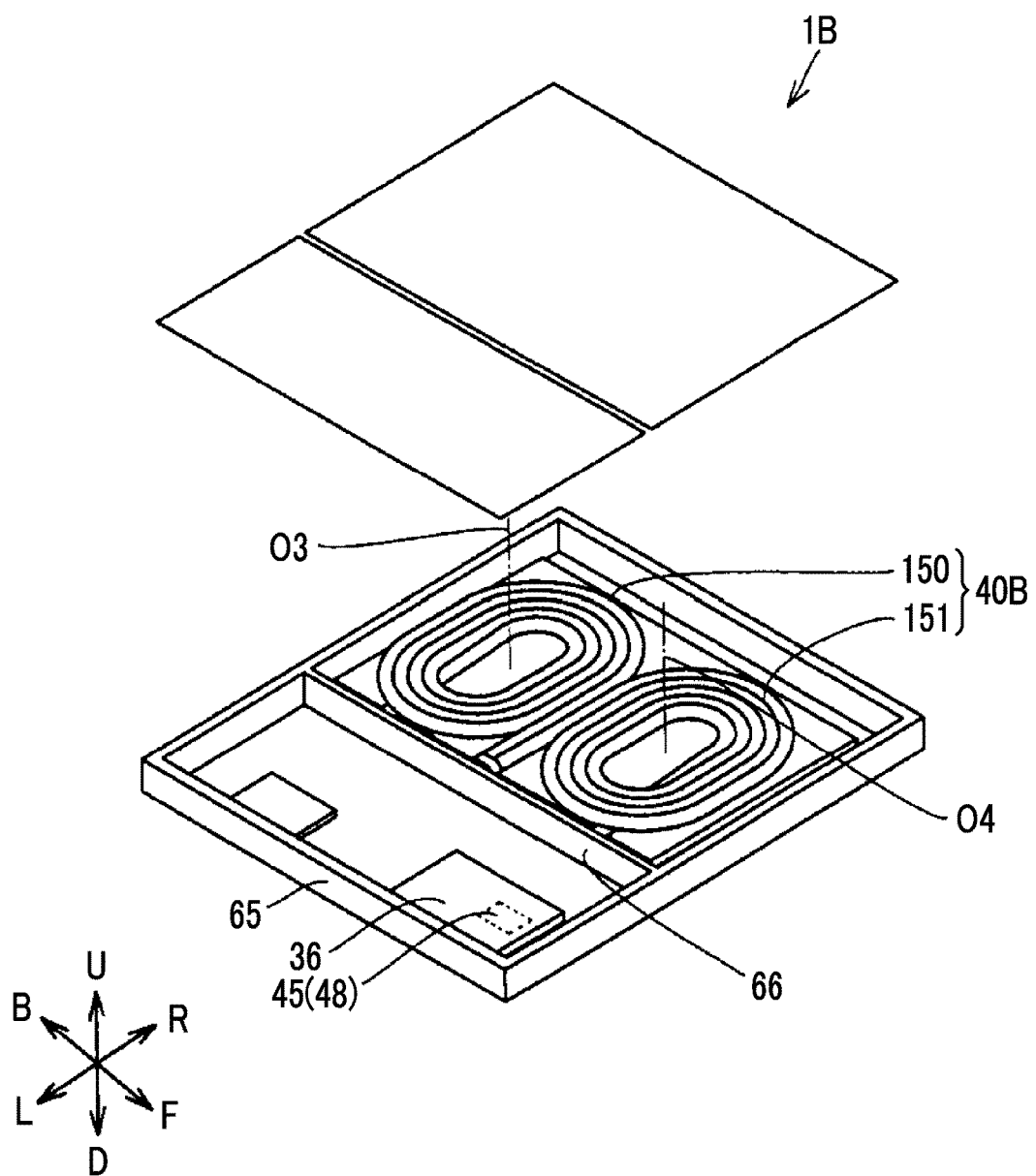
FIG. 12 is a perspective view illustrating a power reception device in which a DD coil is adopted.

FIG. 12 is a perspective view illustrating a power reception device 1B in which a DD coil is adopted. As illustrated in FIG. 12, the power reception device 1B includes a power reception coil 40B. The power reception coil 40B includes a unit coil 150, and a unit coil 151 connected to the unit coil 150.

The unit coil 130 and the unit coil 151 are disposed to be arranged in a front-rear direction of the vehicle.

Here, the unit coil 150 is formed such that the unit coil 150 surrounds a winding axis O3 extending in the up-down direction from one end of the unit coil 150 to the other end of the unit coil 150.

The other end of the unit coil 150 is connected to one end of the unit coil 151. The unit coil 151 is formed such that the unit coil 151 surrounds a winding axis O4 from the one end to the other end of the unit coil 151.

The direction of winding the unit coil 150 from the one end to the other end of the unit coil 150 is opposite to the direction of winding the unit coil 151 from the one end to the other end of the unit coil 151.

The switching elements 48 of the sub DC-DC converter 36 are disposed at positions closer to the left-outer-side wall 65 than to the inner-side wall 66.

In the power reception device 1B, when a current flows in the power reception coil 40B, the electromagnetic field formed in the vicinity of the power reception coil 40B is widely distributed in a direction orthogonal to a direction in which the unit coil 150 and the unit coil 151 are arranged.

The electromagnetic field formed in the vicinity of the power reception coil 40B is widely distributed in the width direction (right-left direction) of the vehicle, and is distributed such that the strength of the electromagnetic field becomes low as the distance from the power reception coil 40B is increased.

Meanwhile, the switching elements 48 of the sub DC-DC converter 36 are disposed at a position close to the left-outer-side wall 65, and the exposure of the switching elements 48 to the electromagnetic field having high strength is suppressed. In this manner, the disclosure can be applied to a power reception device and a power transmission device in which various coils and various ferrite plates are provided.

It should be noted that the embodiments disclosed here are merely examples in all respects, and are not restrictive. The scope of the disclosure is represented by claims not by the above description, and is intended to include the meanings equivalent to the claims and all changes within the scope.

What is claimed is:

1. A power reception device comprising:
   a coil;
   an electric unit electrically connected to the coil; and
   a metal case disposed to be adjacent to the coil, the metal case being configured to accommodate the electric unit, wherein
   the electric unit includes at least one active element,
   the metal case includes an inner-side wall and an outer-side wall,
   the inner-side wall is adjacent to the coil,
   the outer-side wall is positioned such that the inner-side wall is positioned between the coil and the outer-side wall, and
   the at least one active element is provided at a position closer to the outer-side wall than to the inner-side wall.

2. The power reception device according to claim 1, wherein
   the electric unit includes
      a filter including a filter coil connected to the coil,
      a rectifier electrically connected to the filter by a first electric power line and a second electric power line,
      a protection circuit electrically connected to the first electric power line and the second electric power line, and
      a converter electrically connected to the rectifier,
   the protection circuit includes
      a protection controller configured to control driving of the protection circuit by switching between a state in which the first electric power line and the second electric power line are electrically connected, and a state in which the electric connection between the first electric power line and the second electric power line is cut, and
      a converter controller configured to control driving of the converter, and
   a distance between the converter controller and the filter coil is longer than a distance between the protection controller and the filter coil.

3. A power reception device comprising:
   a coil configured by winding a coil wire in a hollow shape;
   a ferrite plate on which the coil is disposed;
   an electric unit electrically connected to the coil; and
   a metal case disposed to be adjacent to the coil, the metal case being configured to accommodate the electric unit, wherein
   the electric unit includes at least one active element,
   the ferrite plate includes a coil mounting surface on which the coil is disposed,
   a notch is provided in an outer peripheral edge portion of the ferrite plate,
   a width of the notch in a direction in which the coil wire extends increases from an inner peripheral edge portion side of the coil to an outer peripheral edge portion side of the coil, and
   the at least one active element is disposed in an adjacent area that is adjacent to the notch, in the metal case.

4. The power reception device according to claim 3, wherein
   the electric unit includes
      a filter including a filter coil connected to the coil,
      a rectifier electrically connected to the filter by a first electric power line and a second electric power line,
      a protection circuit electrically connected to the first electric power line and the second electric power line, and
      a converter electrically connected to the rectifier,
   the protection circuit includes
      a protection controller configured to control driving of the protection circuit by switching between a state in which the first electric power line and the second electric power line are electrically connected, and a state in which the electric connection between the first electric power line and the second electric power line is cut, and
      a converter controller configured to control driving of the converter, and
   a distance between the converter controller and the filter coil is longer than a distance between the protection controller and the filter coil.

5. A power transmission device comprising;
   a coil;
   an electric unit electrically connected to the coil; and
   a metal case disposed to be adjacent to the coil, the metal case being configured to accommodate the electric unit, wherein
   the electric unit includes at least one active element,
   the metal case includes an inner-side wall, and an outer-side wall;
   the inner-side wall is adjacent to the coil,
   the outer-side wall is positioned such that the inner-side wall is positioned between the coil and the outer-side wall, and
   the at least one active element is provided at a position closer to the outer-side wall than to the inner-side wall.

6. The power transmission device according to claim 5, wherein
   the electric unit includes
      a filter including a filter coil connected to the coil,
      a rectifier electrically connected to the filter by a first electric power line and a second electric power line,
      a protection circuit electrically connected to the first electric power line and the second electric power line, and
      a converter electrically connected to the rectifier;
   the protection circuit includes
      a protection controller configured to control driving of the protection circuit by switching between a state in which the first electric power line and the second electric power line are electrically connected and a state in which the electric connection between the first electric power line and the second electric power line is cut, and
      a converter controller configured to control driving of the converter, and
   a distance between the converter controller and the filter coil is longer than a distance between the protection controller and the filter coil.

7. A power transmission device comprising:
   a coil configured by winding a coil wire in a hollow shape;
   a ferrite plate on which the coil is disposed;
   an electric unit electrically connected to the coil; and
   a metal case disposed to be adjacent to the coil, the metal case being configured to accommodate the electric unit, wherein
   the electric unit includes at least one active element,
   the ferrite plate includes a coil mounting surface on which the coil is disposed,
   a notch is provided in an outer peripheral edge portion of the ferrite plate,
   a width of the notch in a direction in which the coil wire extends increases from an inner peripheral edge portion side of the coil to an outer peripheral edge portion side of the coil, and the at least one active element is disposed in an adjacent area that is adjacent to the notch, in the metal case.

8. The power transmission device according to claim 7, wherein the electric unit includes
- a filter including a filter coil connected to the coil,
- a rectifier electrically connected to the filter by a first electric power line and a second electric power line,
- a protection circuit electrically connected to the first electric power line and the second electric power line, and
- a converter electrically connected to the rectifier;

the protection circuit includes
- a protection controller configured to control driving of the protection circuit by switching between a state in which the first electric power line and the second electric power line are electrically connected, and a state in which the electric connection between the first electric power line and the second electric power line is cut, and a converter controller configured to control driving of the converter; and a distance between the converter controller and the filter coil is longer than a distance between the protection controller and the filter coil.

\* \* \* \* \*

UNITED STATES PATENT AND TRADEMARK OFFICE
CERTIFICATE OF CORRECTION

PATENT NO. : 10,410,786 B2
APPLICATION NO. : 15/826173
DATED : September 10, 2019
INVENTOR(S) : Daisuke Kamikihara It is certified that error appears in the above-identified patent and that said Letters Patent is hereby corrected as shown below:

In the Specification

In Column 01, Line 43, delete "dement", and insert --element--, therefor.

In Column 02, Line 60, delete "fee", and insert --the--, therefor.

In Column 03, Line 33, delete "plan-view", and insert --plan view--, therefor.

In Column 04, Line 8, delete "device 11", and insert --device 17--, therefor.

In Column 04, Line 16, delete "felling", and insert --falling--, therefor.

In Column 05, Line 25, delete "titer", and insert --filter--, therefor.

In Column 06, Line 24, delete "direst", and insert --direct--, therefor.

In Column 07, Line 15, delete "body 33", and insert --body 53--, therefor.

In Column 07, Line 52, delete "left-center-side", and insert --left-outer-side--, therefor.

In Column 08, Line 26, delete "comers", and insert --corners--, therefor.

In Column 10, Line 59, delete "cod", and insert --coil--, therefor.

In Column 14, Line 04, delete "2d", and insert --27d--, therefor.

Signed and Sealed this
Twenty-ninth Day of October, 2019

Andrei Iancu
*Director of the United States Patent and Trademark Office*